United States Patent [19]

Ando

[11] Patent Number: 5,925,091
[45] Date of Patent: Jul. 20, 1999

[54] METHOD AND APPARATUS FOR DRAWING A MAP FOR A NAVIGATION SYSTEM

[75] Inventor: Katsunori Ando, Iwaki, Japan

[73] Assignee: Alpine Electronics, Inc., Tokyo, Japan

[21] Appl. No.: 08/654,421

[22] Filed: May 28, 1996

[30] Foreign Application Priority Data

Jun. 12, 1995 [JP] Japan .................................. 7-144436

[51] Int. Cl.⁶ .............................. G01C 21/00; G06G 7/78
[52] U.S. Cl. ......................... 701/212; 701/208; 340/995; 340/990; 342/451; 342/452; 345/441
[58] Field of Search ................................ 364/443, 444.2, 364/449.6, 449.4, 449.1, 449, 460; 340/990, 995, 905, 988, 636; 395/132, 137, 138, 139, 173; 342/451, 457, 452; 73/178 R; 701/200, 208, 209, 210, 211, 212, 117; 345/428, 440–443, 121, 133, 515, 968

[56] References Cited

U.S. PATENT DOCUMENTS

| | | | |
|---|---|---|---|
| 4,402,050 | 8/1983 | Tagani et al. ............................ | 701/300 |
| 4,543,572 | 9/1985 | Tanaka et al. ........................... | 701/208 |
| 4,608,656 | 8/1986 | Tanaka et al. ........................... | 364/443 |
| 4,774,672 | 9/1988 | Tsunoda et al. ......................... | 701/208 |
| 5,093,669 | 3/1992 | Kajiyama ............................. | 364/449.6 |
| 5,115,399 | 5/1992 | Nimura et al. .......................... | 701/208 |
| 5,212,643 | 5/1993 | Yoshida .................................... | 701/212 |
| 5,257,023 | 10/1993 | Furuya ..................................... | 364/436 |
| 5,272,638 | 12/1993 | Martin et al. ............................ | 364/444 |
| 5,274,387 | 12/1993 | Kakihara et al. ..................... | 364/449.3 |
| 5,293,163 | 3/1994 | Kakihara et al. ..................... | 364/449.4 |
| 5,353,034 | 10/1994 | Sato et al. ................................ | 701/208 |
| 5,402,120 | 3/1995 | Fujii et al. ............................... | 701/209 |
| 5,523,765 | 6/1996 | Ichikawa ................................. | 701/213 |
| 5,539,399 | 7/1996 | Takahira et al. ..................... | 364/449.1 |
| 5,543,572 | 8/1996 | Tanaka et al. ........................ | 364/449.2 |
| 5,574,648 | 11/1996 | Pilley .................................... | 364/449.2 |
| 5,613,055 | 3/1997 | Shimoura et al. ...................... | 364/443 |
| 5,638,279 | 6/1997 | Kishi et al. .............................. | 364/443 |

*Primary Examiner*—Jacques H. Louis-Jacques
*Attorney, Agent, or Firm*—Brinks Hofer Gilson & Lione

[57] ABSTRACT

In a vehicle navigation method and apparatus for drawing a map in which the scale of a displayed map is reduced to display a second wide-area map, an image of a presently-traveled road is drawn on the display so it is superimposed on the wide-area map, even if the wide-area map otherwise does not show the presently-traveled road. When the scale of the presently displayed map is reduced to instead display the wide-area map, a determination is made as to whether the presently-traveled road is displayed. If the presently-traveled road is not displayed, an image of the presently-traveled road is generated from map information pertaining to the presently-traveled road and the image is displayed so it is superimposed on the wide-area map.

25 Claims, 8 Drawing Sheets

METHOD AND APPARATUS FOR DRAWING A MAP FOR A NAVIGATION SYSTEM

BACKGROUND OF THE INVENTION

1. Field of the Invention

This invention relates to a vehicle navigation system and more particularly to map drawing for such a system.

2. Description of the Related Art

In a vehicle navigation system, map data corresponding to the present position of the vehicle is read out from a map data storage medium, such as a compact disk read-only memory (CD-ROM), in order to draw (display) a corresponding map on a display screen. As the vehicle travels, a vehicle position mark is moved on the map or the map is scrolled while the vehicle position mark is fixed at a predetermined position (e.g., the position corresponding to a center of the display screen).

The map data includes (1) road "layers" including node data link data, intersection data and the like, (2) background "layers" for displaying objects on a map, and 3) character "layers" for displaying names of cities, towns, villages and the like. A map image displayed on the display screen is generated on the basis of the background layers and the character layers. Map matching processing and guide route searching are performed on the basis of the road layers.

Maps at a plurality of scales, from a small scale for a wide-area map to a large scale for a detailed map, are stored in the CD-ROM. A map at the scale selected by the user is drawn on the display screen. In a detailed map, a small area occupies the entire display screen. In such a detailed map of course, even minor (narrow) roads are displayed. On the other hand, in a wide-area map, only major (wide) roads, such as national highways, expressways and e.g. prefectural roads, are displayed, while minor roads are omitted, because a wide area occupies the screen.

Figure 8A:
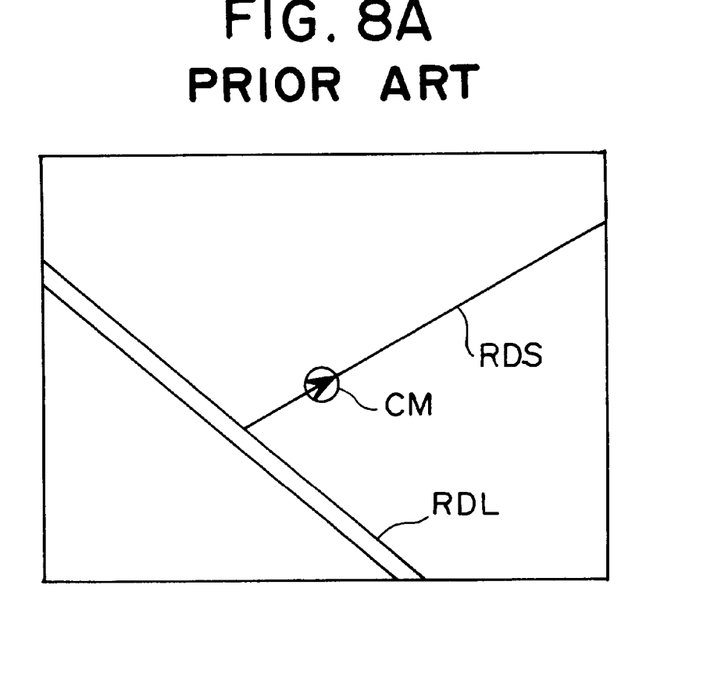
FIGS. 8A and 8B are diagrams illustrating the problem addressed by the present invention.
Figure 8B:
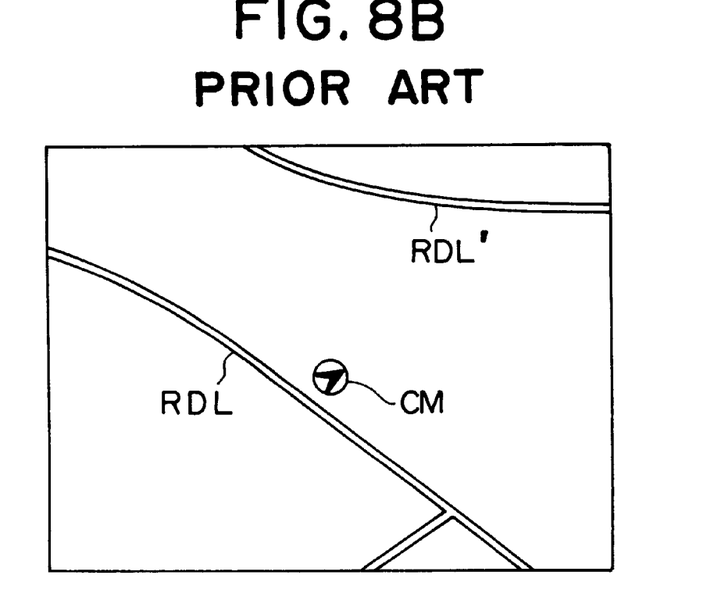

A situation may occur in which, when the vehicle is travelling on a narrow (minor) road RDS with a detailed map displayed as shown in FIG. 8A, a wide-area map at a scale e.g. one level smaller than that of the detailed map is displayed. In such a case as shown in FIG. 8B, the road RDS on which the vehicle is traveling is not displayed and only a mark CM indicating the vehicle position is displayed, spaced apart from any of the displayed roads.

As described above, if a presently traveled road is not displayed on the display screen when a certain scale is selected, the user (e.g. the driver) does not know the direction in which his vehicle is traveling. Then a need for changing the scale arises. However, changing the scale while driving is dangerous because it distracts the driver. Moreover, it is difficult for the user to determine his vehicle position even by changing the map scales, so that there is a possibility of the user losing his way. The possibility of the user becoming unable to determine the traveling direction is particularly strong if the presently travelled road diverges (branches off).

SUMMARY OF THE INVENTION

In view of this problem, a goal of the present invention is to display a map so when a scale at which the map is displayed is reduced so as to display a wide-area map, an image of a presently traveled road is displayed on the display screen so it is superimposed on the wide-area map, even if the data of the wide-area map does not include any data pertaining to the presently-traveled road, i.e. even if the wide area map does not show the presently-traveled (minor) road.

When the scale of the displayed map is reduced to display instead a wide-area map, a determination is made as to whether the presently-traveled road is displayed on the display screen. If the presently-traveled road is not displayed, an image of the presently-traveled road is generated from map information pertaining to the presently-traveled road and the image is drawn on the display screen so it is superimposed on the wide-area map. In this manner, the image of the presently-traveled road is displayed on the display screen so it is superimposed on the wide-area map, even if the data of the wide-area map does not include any map data pertaining to the presently-traveled road.

DETAILED DESCRIPTION

Overview

Figure 1A:
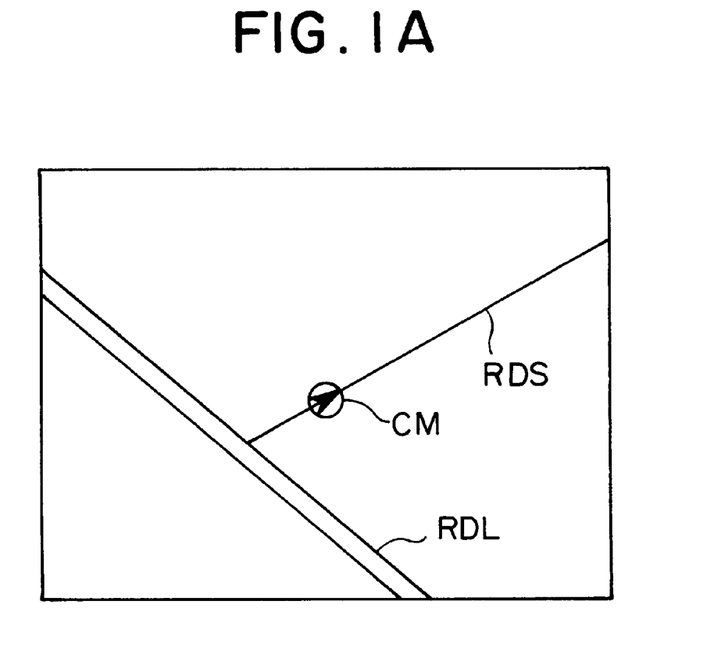
FIGS. 1A and 1B are diagrams illustrating an embodiment of the present invention.
Figure 1B:
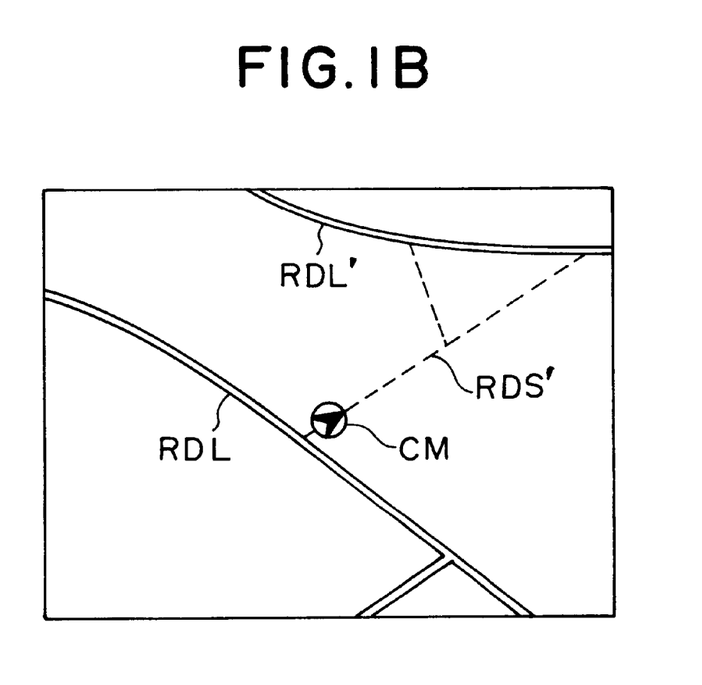

FIGS. 1A and 1B are schematic diagrams illustrating a map drawing method in accordance with the present invention. FIG. 1A is a detailed map (at a large scale) and FIG. 1B is a wide-area map (at a small scale). These figures illustrate roads RDL and RDL' which are major (wider) roads such as national roads or e.g. prefectural roads, a road RDS which is a minor (narrower) road such as a byroad, and a vehicle position mark CM indicating the position of the vehicle.

Suppose that when the vehicle is traveling on the narrow road RDS while the detailed map is drawn (FIG. 1A), an operating unit (such as a remote controller) is operated by the user to display the wide-area map at a scale one step smaller. The navigation system then displays the wide-area map on the display screen and determines whether the wide-area map contains the presently-traveled road RDS (i.e. whether the presently-traveled road is displayed). If the wide-area map does not contain the presently-traveled road, the navigation system generates a visible image RDS' of the presently-traveled road in the form e.g. of a broken line by using map information (road layer information or detailed map data) pertaining to the presently-traveled road, and displays the presently-traveled road image RDS' on the display screen by superimposing it on the wide-area map (FIG. 1B).

Apparatus

Figure 2:
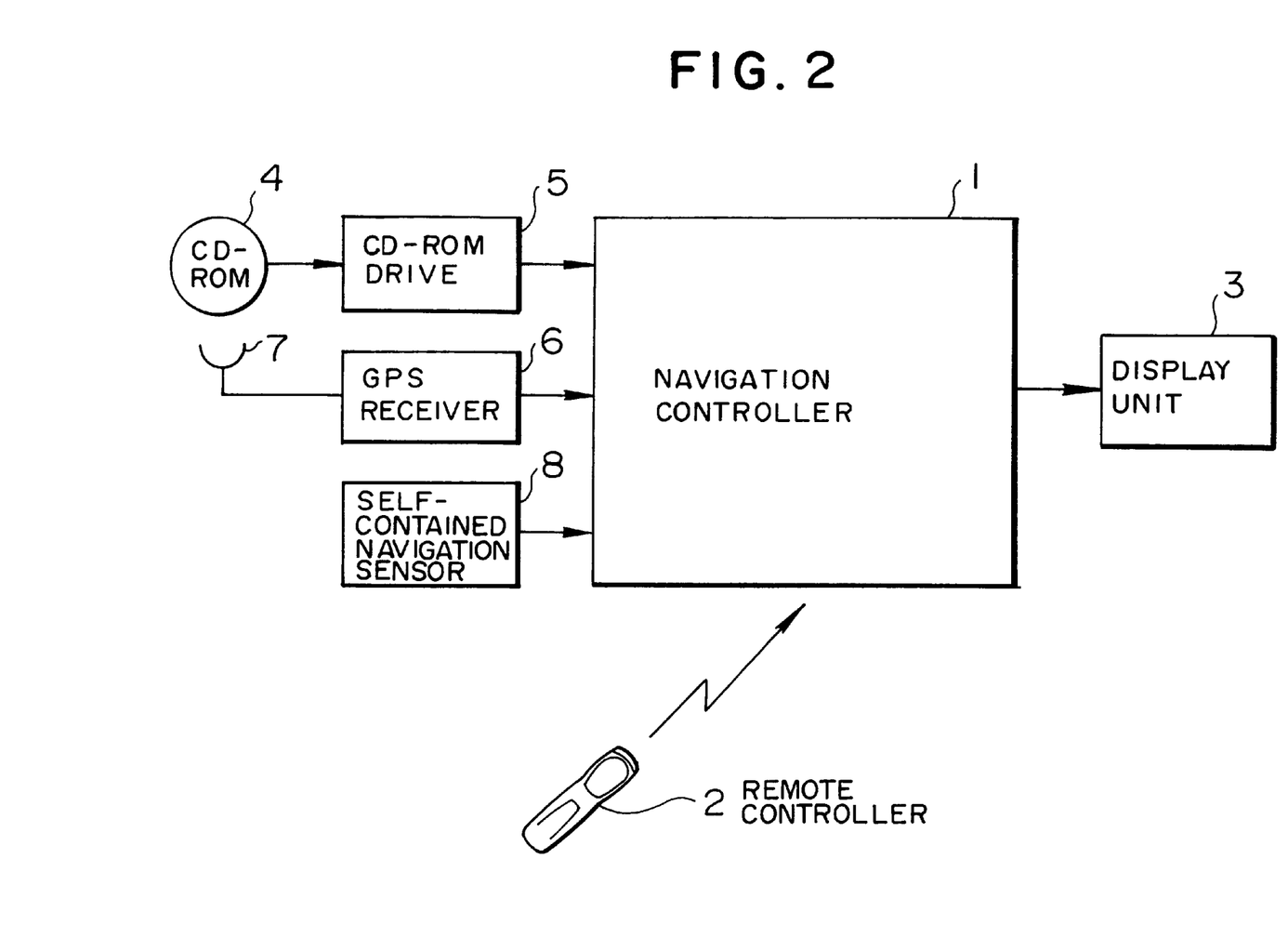
FIG. 2 is a diagram of the configuration of a navigation system in accordance with the present invention.

FIG. 2 shows a navigation system which includes a navigation controller 1, an operating unit, e.g., a remote controller 2 for inputting various instructions (to enlarge or reduce a map, to move a cursor etc.) to the navigation controller, and for instructing the navigation controller to search for a guide route, and a display unit 3 for displaying a map, a vehicle position mark, a guide route, and various menus. The navigation system also includes a map storage medium for storing map information, e.g., a CD-ROM 4, an associated CD ROM drive 5, a conventional global positioning system (GPS) receiver 6 for receiving GPS signals from GPS satellites to measure the present position and direction of the vehicle, a multiple beam antenna 7 for receiving the GPS signals from the satellites, and a conventional sensor 8 for self-contained (dead reckoning) navigation. The GPS receiver 6 calculates the position and direction of the vehicle by e.g. three-dimensional or two-dimensional position-measuring processing (the direction being obtained as a line connecting the present vehicle position and the vehicle position measured one sampling time before), and outputs the calculated position and direction along with the position-measuring time. The self-contained navigation sensor 8 includes a relative direction sensor (an angle sensor, not shown) such as a vibration gyrocompass for detecting any turning of the vehicle, and a distance measurement sensor (not shown) which generates one pulse each time a predetermined distance is traveled.

Figure 3:
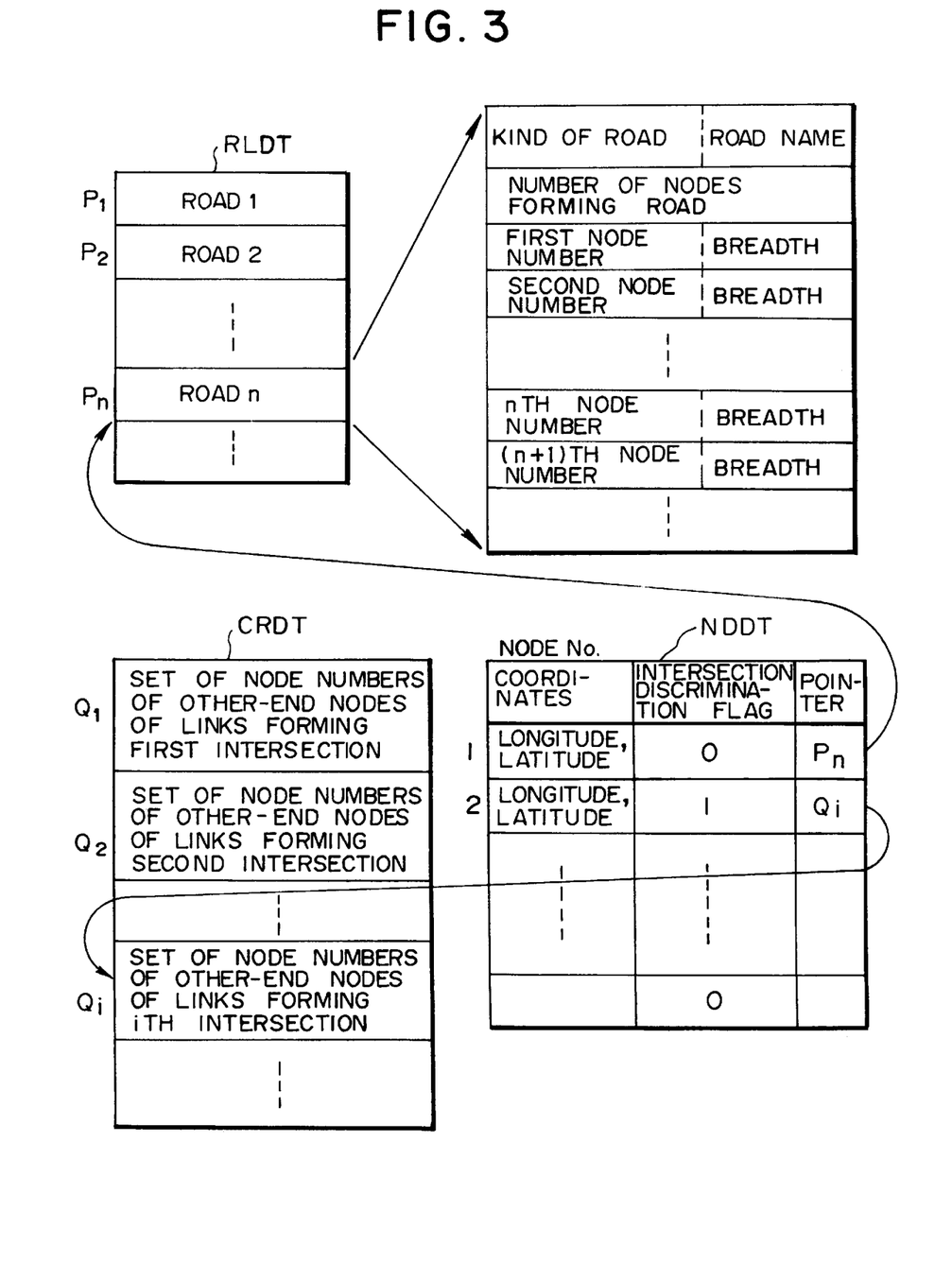
FIG. 3 is a diagram of the structure of road data in map data.

The map information conventionally includes (1) road layers, (2) background layers for displaying objects on a map, (3) character layers for displaying names of cities, towns, villages and the like, and (4) integrated information service (IIS) layers for storing IIS information. Of these layers, each road layer includes, as shown in FIG. 3, road link data RLDT, node data NDDT and crossing data CRDT.

Road link data RLDT is provided as information pertaining to attributes of corresponding roads and includes a total number of roads in a road link, the numbers of nodes (data points) defining each road, road numbers (road names) and the kinds of road (e.g. national highway, expressway, prefectural road etc.)

Crossing data CRDT is a set of nodes closest to each intersection on a map (intersection forming nodes) in the nodes of links connecting to the intersection. Node data NDDT is a list of all nodes defining each road and includes, with respect to each node, position information (longitude, latitude), an intersection discrimination flag for indicating whether the node corresponds to an intersection, and a pointer which designates intersection data if the node corresponds to an intersection or designates the road link to which the node belongs if the node does not correspond to any intersection.

Figure 4:
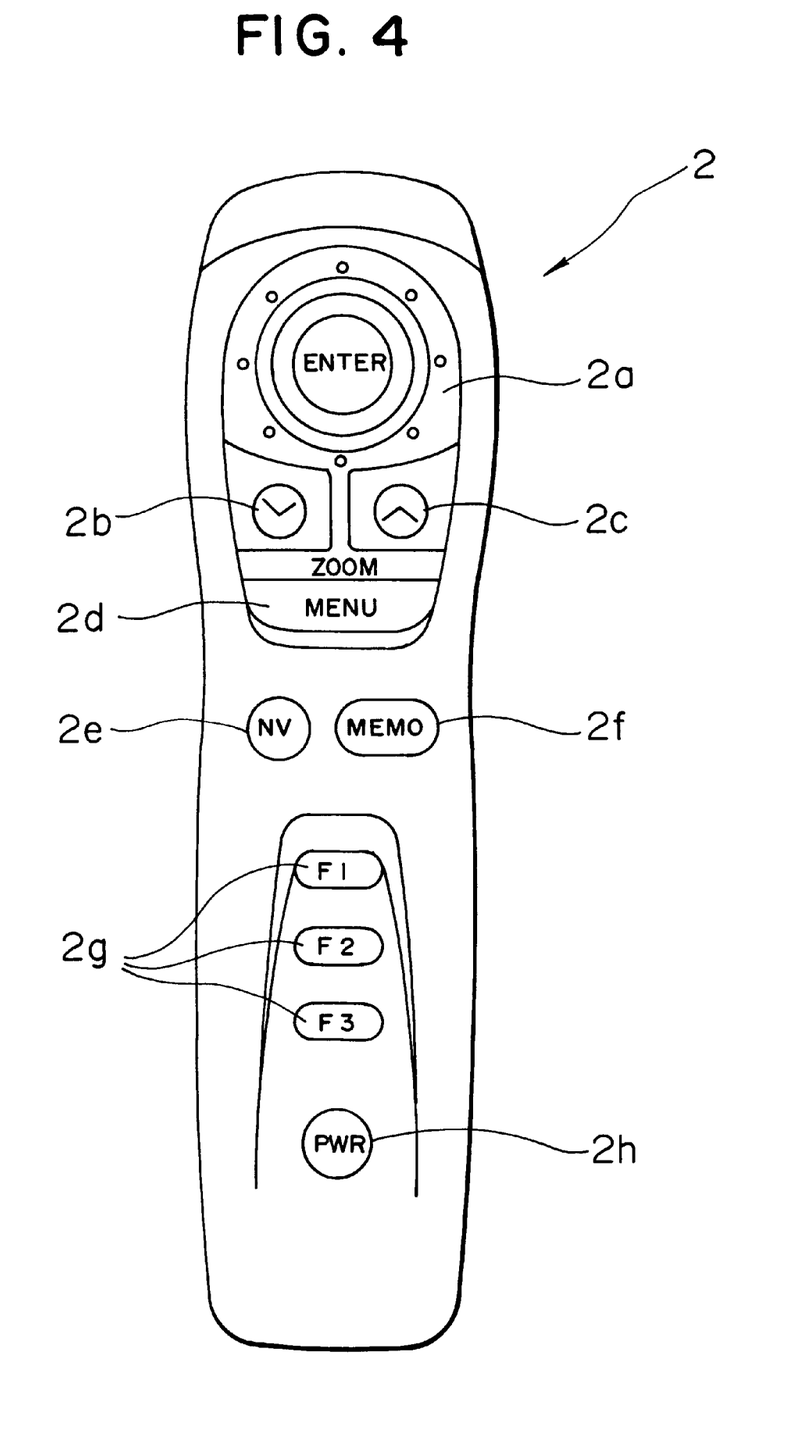
FIG. 4 is a diagram of the external appearance of a remote controller in accordance with the present invention.

FIG. 4 shows the exterior of the remote controller which has various keys described below. Joystick key 2a is operated (1) when a cursor, or a vehicle mark is moved in one of eight directions relative to a map, (2) when a menus selecting bar is moved in the vertical and horizontal directions to select a desired menu item, and (3) when a cursor position is set and input or a menu is selected, and at the time of other operations. Enlargement key 2b is operated when a more detailed map is to be displayed. Reduction key 2c is to be operated when a wide-area map is displayed. Menu key 2d is operated to display a menu. Key 2e is a navigation (NV) key for displaying a map having a point corresponding to the user's vehicle position along with the user's vehicle mark. Key 2f is a memory (MEMO) key operated to store a desired point. Functions frequently used are set in combination with function keys 2g and are each selected by operating the corresponding one of function keys 2g. Key 2h is the power key.

Figure 5:
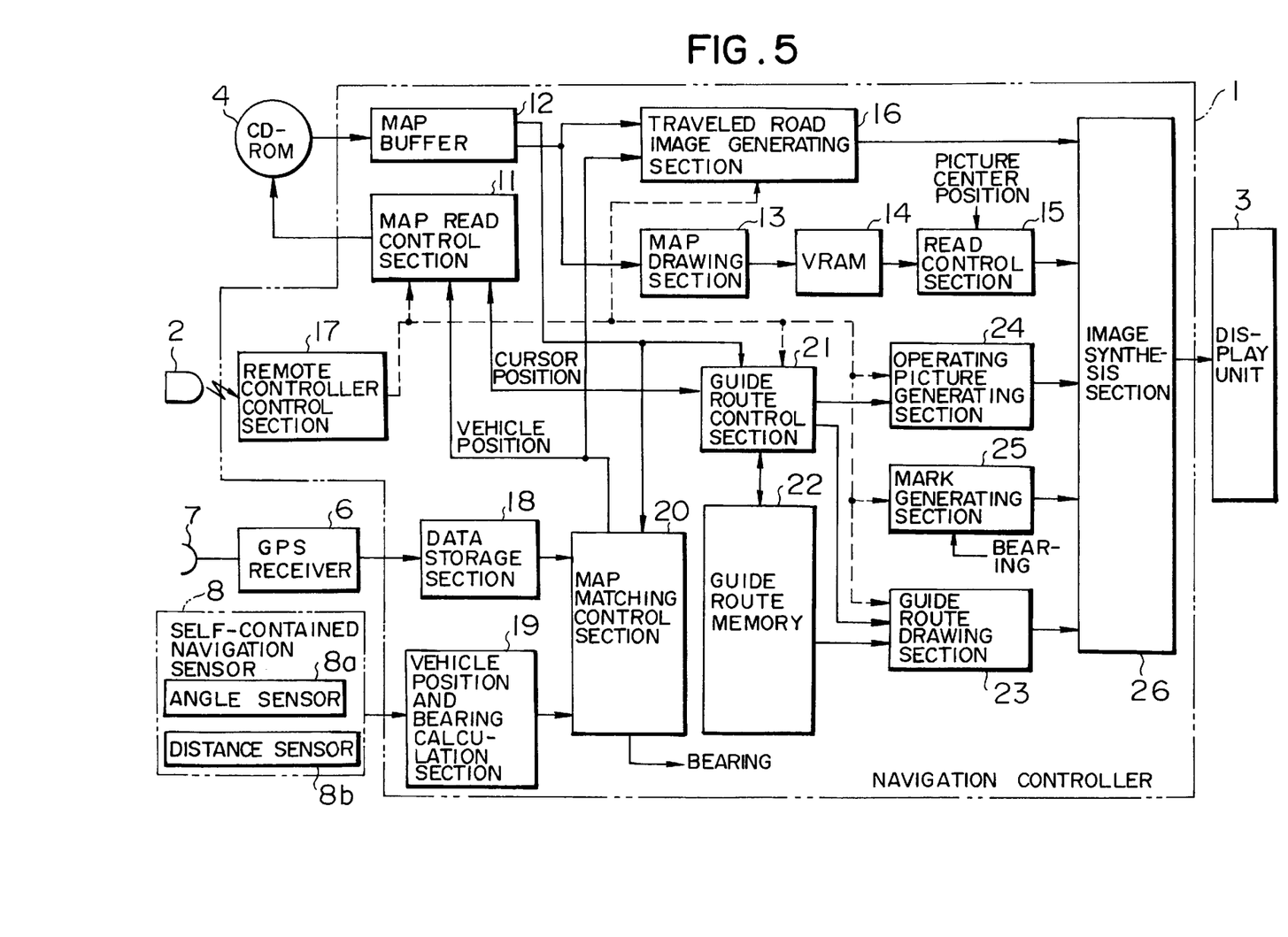
FIG. 5 is a diagram of a navigation controller in accordance with the present invention.

FIG. 5 shows the navigation controller 1 along with the remote controller 2, the display unit 3, the CD-ROM 4 in which map information is stored, the GPS receiver 6, the multiple beam antenna 7, and the self-contained navigation sensor 8 having a relative direction sensor (angle sensor) 8a such as a vibration gyrocompass for detecting the angle of turning of the vehicle, and a distance measurement sensor 8b which generates one pulse each time a predetermined distance is traveled.

The navigation controller 1 has a map read control section 11 for (1) calculating the cursor position (picture center position) when the operation of moving a map or selecting a map area by the joystick key, the reduction key, or the enlargement key is performed, and (2) reading out predetermined map information from the CD-ROM 4 on the basis of e.g. the vehicle position, or a user selected position. A map buffer 12 stores map information read out from the CD-ROM. Map information pertaining to a plurality of pages (units), e.g., 3×3 units of map information pertaining to the vehicle position or the cursor position, is read to the map buffer 12 from the CD-ROM to enable map scrolling as described below. A map drawing section 13 generates a map image from map information stored in the map buffer 12. A video random access memory (VRAM) 14 stores the map image. A read control section 15 displays a map while scrolling the map according to the movement of the vehicle position or cursor movement, by changing the position of one picture from the VRAM 14 on the basis of the picture center position (vehicle position, or cursor position).

Detailed Process

Figure 6A:
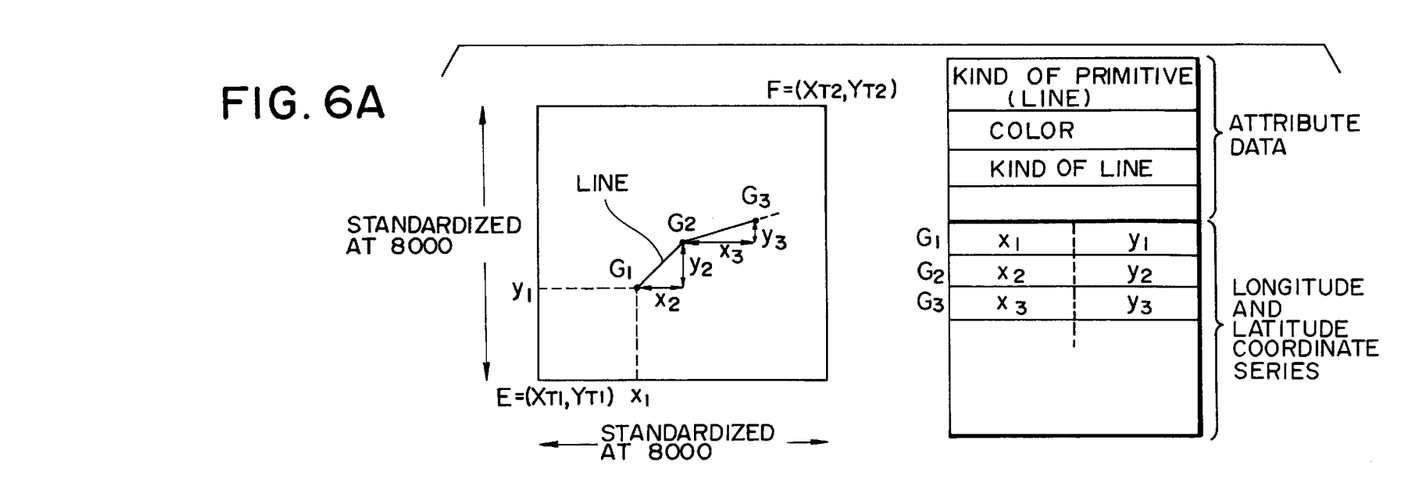
FIGS. 6a and 6b are diagrams of map figure data.
Figure 6B:
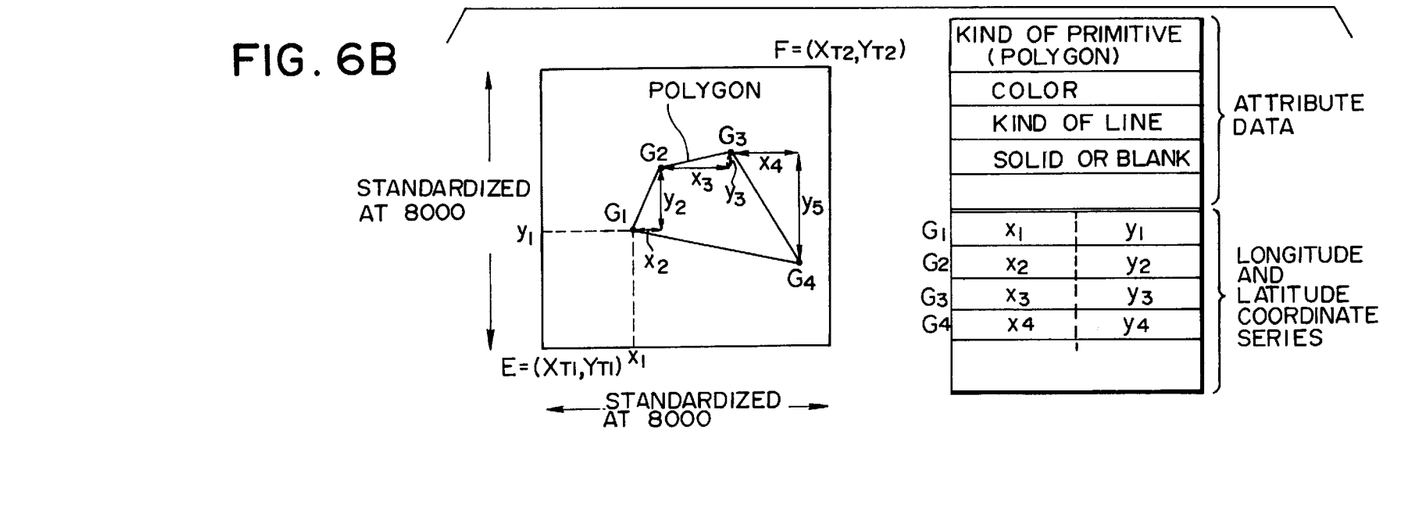

Each map stored in the CD-ROM 4 is divided into units sectioned by longitude and latitude selected according to the map scale. The ranges of the absolute longitude and latitude coordinates of one unit of map data are managed through absolute longitude and latitude coordinates $(X_{T1}, Y_{T1})$ and $(X_{T2}, Y_{T2})$ of diagonal vertices E and F, as shown in FIGS. 6A and 6B. One unit of map data includes a multiplicity of map figures such as those representing roads, parks, etc., and the data of such map figures includes data representing attributes, i.e. various kinds of image primitives such as lines and polygons, colors, kinds of line, and solid or blank, and longitude and latitude coordinate series $(x_1, y_1), (x_2, y_2) \ldots (x_n, y_n)$ of elemental points $G_1$ to $G_n$ corresponding to turning points in the case of a line or vertexes in the case of a polygon, as shown in FIGS. 6A and 6B. Coordinates $(x_1, y_1), (x_2, y_2), \ldots (x_n, y_n)$ are expressed as standardized relative longitude and latitude coordinates. That is, with respect to one unit of map data, the X and Y components of $G_1$ and E when X and Y coordinates are standardized in the range of $X_{T2}-X_{T1}=8000_H$ and the range of $Y_{T1}-Y_{T2}=8000_H$ (H: hex) are represented by $x_i$ and $y_i$. Also, the X and Y components of the difference between $G_2$ and $G_1$ are represented by $x_2$ and $y_2$. Similarly, the X and Y components of the difference between $G_i$ and $G_{i-1}$ are represented by $x_i$ and $y_i$. When a map image is drawn using map figure data, the map drawing section 13 converts the longitude and latitude coordinates (relative longitude and latitude coordinates) designating elemental points such as line turning points or polygon vertexes into dot coordinates stored in the VRAM 14, and draws a map figure in the VRAM 14 by forming lines connecting the converted dot coordinates.

When an enlargement or reduction operation is performed using the remote controller 2, the map read control section 11 reads out, from the CD-ROM 4 to the map buffer 12, map data at a map scale one level larger or smaller than the scale of the map presently displayed, and the map drawing section 13 performs map enlargement or reduction by redrawing a map image at the scale one level larger or smaller in the VRAM 14 on the basis-of this map data. When the map scrolling operation is performed using the joystick key 2a, the map read control section 11 calculates the cursor coordinate position (picture center position) and the read control section 15 reads out data of a one-picture area on the cursor coordinates from the VRAM 14 and inputs this data to the display unit 3 to enable map display in a scrolling manner. Immediately before the range of reading from the VRAM 14 exceeds the limit of the map image in the VRAM 14, the map read control section 11 reads out data of the next adjacent map from the CD-ROM, 4 and the map drawing section 13 redraws an image of the adjacent map on the VRAM 14 on the basis of this adjacent map image.

A traveled road image generating section 16 determines whether the map data read to the map buffer 12 includes data pertaining to the presently-traveled road; in other words, whether the presently-traveled road is displayed. If the presently-traveled road is not displayed, an image of the presently-traveled road is generated in the form of e.g. a broken line by using map information pertaining to the presently-traveled road so as to be discriminable from other map figures. A remote controller control section 17 receives signals in accordance with remote controller operations and sends instructions to the related sections. A GPS data storage section 18 stores GPS data from the GPS receiver 6. A vehicle position and bearing calculation section 19 calculates the position and bearing of the vehicle on the basis of output signals from the self-contained navigation sensor 8. A map matching control section 20 performs map matching processing using map information read to the map buffer 12 and travel locus data to correct the vehicle position at suitable times.

The traveled road image generating section 16 determines whether the presently-traveled road is displayed on the display screen according to whether the vehicle position is on a road presently displayed or within a predetermined distance from a presently drawn road, taking into consideration any error in determining the vehicle position. For example, the traveled road image generating section 16 determines whether the presently-traveled road is displayed on the display screen by determining whether the vehicle is position is on a line (road) expressed by map data of a figure such as a line or polygon. If it determines that the presently-traveled road is not displayed, it generates an image of the presently traveled road as described below.

According to a first generation method, traveled road image generating section 16 requests the map read control section 11 to read out data of a detailed map including data of the presently-traveled road to the map buffer 12, and generates an image of the presently-traveled road by using figure data of the presently-traveled road read out to the map buffer 12. In this case, if the scale of the displayed map is 1/n while the scale of the detailed map is 1/m (where m<n), the image of the presently-traveled road is displayed by at a scale of m/n. If the amount of the image data is large, the data is suitably adjusted ("thinned out") to generate a presently-traveled road image which is readily visible.

According to a second generation method, the traveled road image generating section 16 obtains a node series (longitude and latitude coordinates) defining the road containing the vehicle position from the road layers, stores this node series in its internal memory, and generates an image of the presently-traveled road in the form of a string of dots by using this node series. An image of the presently traveled road reaching a displayed major road will suffice. If the presently-traveled road branches into e.g. two roads before reaching a displayed road, the roads between the branching point and the displayed road are displayed.

A guide route control section 21 conventionally searches for a guide route. A guide route memory 22 stores the guide route. A guide route drawing section 23 draws the guide route. The guide route memory 22 stores data of the positions of all nodes on the guide route from a starting point to a destination point found by the guide route control section 21. The guide route drawing section 23 reads out guide route information (a node series) from the guide route memory 22 and draws the guide route during traveling. An operating picture generating section 24 displays various menu pictures (operating pictures). A mark generating section 25 displays various marks including the vehicle mark and the cursor. Section 26 is an image synthesis section.

Map Drawing Process

Figure 7:
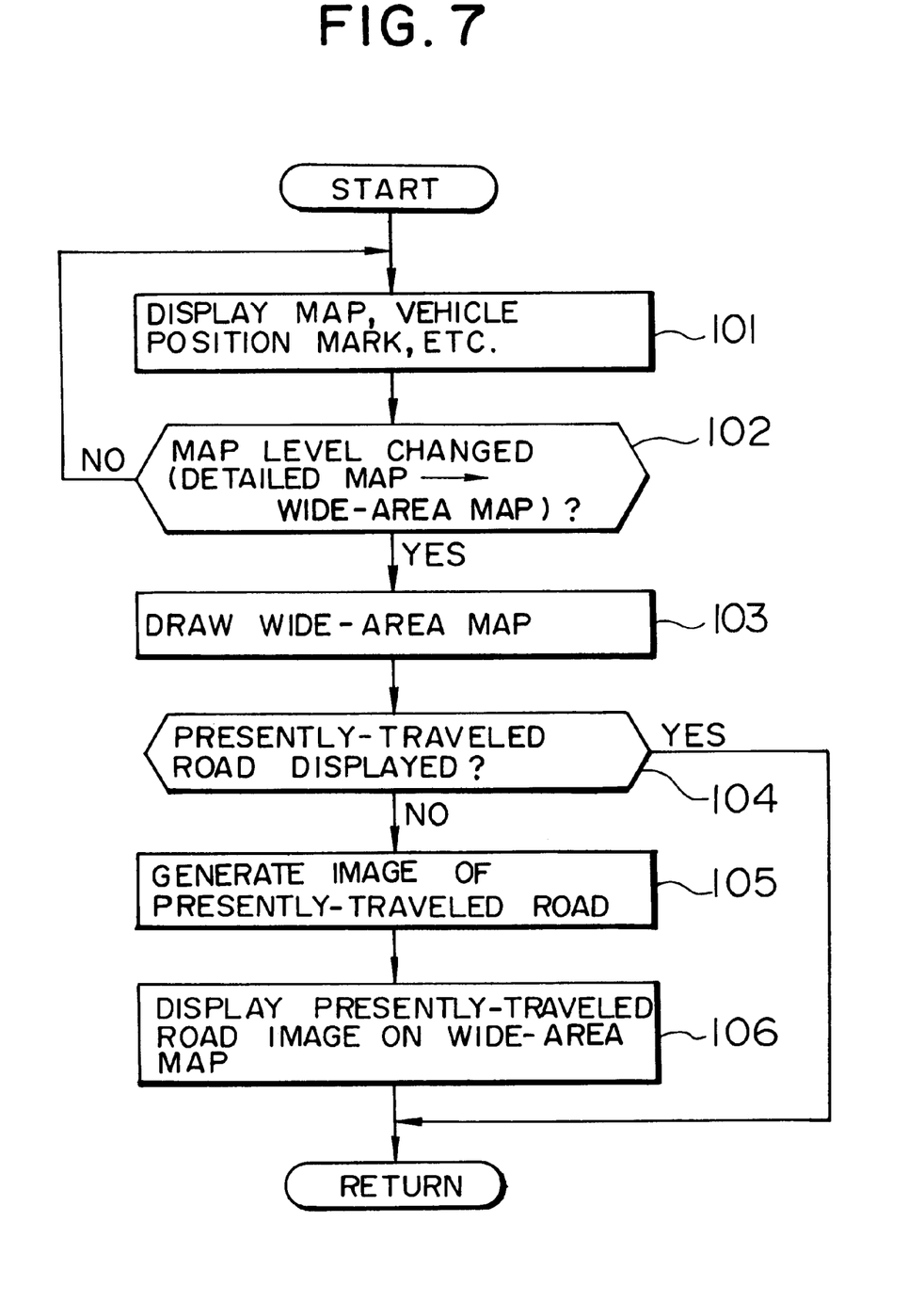
FIG. 7 is a flowchart of map drawing processing in accordance with the present invention.

FIG. 7 is a flowchart of a map drawing computer program in accordance with the present invention.

A map selected according to the present vehicle position and the vehicle position mark on this map are displayed on the display screen (Step 101). The present state is monitored as to whether a request for drawing a wide-area map at a scale one level smaller has been input by the remote controller 2 operation (Step 102). If a request for a wide-area map is input, the map read control section 11 reads out map data at a map scale one level smaller from the CD-ROM 4 to the map buffer 12, and the map drawing section 13 redisplays the map image at the smaller scale in the VRAM 14 on the basis of this map data, thereby displaying the wide-area map (Step 103). Then the traveled road image generating section 16 determines whether the vehicle position is on a certain road, in other words, whether the presently traveled road is displayed on the wide-area map (Step 104). If the presently-traveled road is displayed, the process returns to the initial step to repeat the subsequent steps.

If the presently-traveled road is not displayed on the wide-area map, an image of the presently-traveled road is generated by the above-described first or second generation method (Step 105) and the traveled road image is displayed so it is superimposed on the wide-area map (Step 106).

The presently-traveled road is always displayed, so long as it can be displayed without a considerable imbalance between the scale of the displayed map and the rank (width) of the road. If the rank of the presently traveled road at the time of the wide-area display is sufficiently low, it is not necessary to display the presently-traveled road. However, the presently-traveled road is displayed if there is a sufficient room for displaying it in the displayed map area.

According to the present invention, as described above, when the scale of a displayed map is reduced so as instead to display a wide-area map, a determination is made as to whether the presently-traveled road is displayed on the display screen. If the presently-traveled road is not displayed, an image of the presently traveled road is generated from map information pertaining to the presently-traveled road and is displayed on the display screen, so it is superimposed on the wide-area map. Therefore, even if the wide-area map defined by changing the map scale does not show the presently-traveled road, the presently-traveled road is displayed on the display screen so it is superimposed on the wide-area map.

The present invention has been described with respect to one embodiment, but is not so limited. The present invention is intended to cover various modifications and equivalent arrangements included within the spirit and scope of the appended claims.

What is claimed is:

1. A map drawing method in which a map showing a present vehicle position is displayed while a mark representing the vehicle position is displayed on the map, the method comprising the steps of:

determining whether a presently-traveled road is displayed on the map;

generating an image of the presently-traveled road if the presently-traveled road is not already displayed on the map; and displaying the image of the presently-traveled road by superimposing the generated image of the presently-traveled road on the displayed map that did not otherwise display the presently-traveled road.

2. A map drawing method according to claim 1, further comprising storing map data including at least road data, wherein the stored map data includes a figure attribute.

3. A map drawing method according to claim 1, wherein the step of determining includes determining whether the presently-traveled road is displayed according to whether the vehicle position is on a presently displayed road or whether the vehicle position is within a predetermined distance of a presently displayed road taking into consideration a vehicle position error.

4. A map drawing method according to claim 3, wherein the step of determining includes determining according to whether the vehicle position is on a road expressed by figure data.

5. A map drawing method according to claim 1, wherein if the presently-traveled road branches before reaching a road displayed on the map, the branch roads are displayed.

6. A map drawing method according to claim 1, wherein the step of generating an image includes accessing a map buffer and further includes the steps of:

writing data of a second map containing the presently-traveled road into the map buffer; and generating the image of the presently-traveled road from the data written into the map buffer.

7. A map drawing method according to claim 6, wherein if a scale of the di splayed map is 1/n while the scale of the second map is 1/m where m<n, the image of the presently-traveled road is displayed at a scale of m/n.

8. A map drawing method according to claim 7, wherein the image of the presently-traveled road is adjusted if an amount of the data exceeds a predetermined value.

9. A map drawing method according to claim 1, wherein the step of generating an image includes accessing a memory and includes the steps of:

obtaining data defining a road passing the vehicle position from road layer data, and storing the obtained data in the memory; and generating the image of the presently-traveled road from the stored data.

10. A map drawing method according to claim 1, wherein the step of determining occurs upon selecting a change of a scale of the displayed map.

11. A map drawing method in which a map showing a vehicle position is displayed while a mark representing the vehicle position is displayed on the map, the method comprising the steps of:

determining whether a presently-traveled road is displayed according to whether the vehicle position is on a presently displayed road or whether the vehicle position is within a predetermined distance of a presently displayed road;

generating an image of the presently-traveled road using data pertaining to the presently-traveled road if the presently-traveled road is not already displayed on the map; and displaying the image of the presently-traveled road on the display screen by superimposing the image of the presently-traveled road on the displayed map that did not otherwise display the presently-traveled road.

12. A map drawing method according to claim 11, wherein the step of determining takes into consideration a vehicle position error.

13. A map drawing method according to claim 11, wherein the step of generating an image includes accessing a map buffer and further includes the steps of:

writing data of a second map showing the presently-traveled road into the map buffer; and generating the image of the presently-traveled road from the data written into the map buffer.

14. A map drawing method according to claim 13, wherein if a scale of the map is 1/n while the scale of the second map is 1/m where m<n, the image of the presently-traveled road is displayed at a scale of m/n.

15. A map drawing method according to claim 14, wherein the image of the presently-traveled road is adjusted if an amount of the data exceeds a predetermined value.

16. A map drawing method according to claim 11, wherein the step of generating an image includes accessing a memory and further includes the steps of:

obtaining data defining a road passing the vehicle position, and storing the obtained data in the memory; and generating the image of the presently-traveled road from the stored data.

17. A navigation apparatus in which a map showing a present vehicle position is displayed while a mark representing the vehicle position is displayed on the map, the apparatus comprising:

a traveled road image generating section which determines whether a presently-traveled road is displayed according to whether the vehicle position is on a presently displayed road or whether the vehicle position is within a predetermined distance of a presently displayed road, the traveled road image generating section generating an image of the presently-traveled road using data pertaining to the presently-traveled road, if the presently-traveled road is not already displayed on the map; and an image synthesis section coupled to the traveled road image generating section and which displays the image of the presently-traveled road by superimposing the image of the presently-traveled road on the displayed map that did not otherwise display the presently-traveled road.

18. A navigation apparatus according to claim 17, wherein if the presently-traveled road branches before reaching a road displayed on the map, the branch roads are displayed.

19. A navigation apparatus according to claim 17, wherein the traveled road image generating section includes a map buffer, and wherein the traveled road image generating section writes data of a second map showing the presently-traveled road into the map buffer and generates the image of the presently-traveled road from the data written into the map buffer.

20. A navigation apparatus according to claim 19, wherein if a scale of the displayed map is 1/n while the scale of the second map is 1/m where m<n, the image of the presently-traveled road is displayed at a scale of m/n.

21. A navigation apparatus according to claim 20, wherein the image of the presently-traveled road is adjusted if an amount of the data exceeds a predetermined value.

22. A navigation apparatus according to claim 17, wherein the traveled road image generating section includes a memory, and wherein the traveled road image generating section obtains data defining a road passing the vehicle position, stores the obtained data in the memory, and generates the image of the presently-traveled road from the stored data.

23. A map drawing method in which a map showing a present vehicle position is displayed while a mark representing the vehicle position is displayed on the map, the method comprising the steps of:

determining whether a presently-traveled road is displayed on the map;

displaying the image of the presently-traveled road by superimposing the generated image on the displayed map;

wherein the step of generating an image includes accessing a map buffer and further includes the steps of;

writing data of a second map containing the presently-traveled road into the map buffer; and generating the image of the presently-traveled road from the data written into the map buffer; and wherein of a scale of the displayed map is 1/n while the scale of the second map is 1/m where m<n, the image of the presently-traveled is displayed at a scale of m/n.

24. A map drawing method in which a map showing a vehicle position is displayed while a mark representing the vehicle position is displayed on the map, the method comprising the steps of:

determining whether a presently-traveled road is displayed according to whether the vehicle position is on a presently displayed road or whether the vehicle position is within a predetermined distance of a presently displayed road;

generating an image of the presently-traveled road using data pertaining to the presently-traveled road if the presently-traveled road is not displayed; and displaying the image of the presently-traveled road on the display screen by superimposing the image on the displayed map;

wherein the step of generating an image includes accessing a map buffer and further includes the steps of;

writing data of a second map showing the presently-traveled road into the map buffer; and generating the image of the presently-traveled road from the data written into the map buffer; and wherein if a scale of the map is 1/n while the scale of the second map is 1/m where m<n, the image of the presently-traveled road is displayed at a scale of m/n.

25. A navigation apparatus in which a map showing a present vehicle position is displayed while a mark representing the vehicle position is displayed on the map, the apparatus comprising:

traveled road image generating section which determines whether a presently-traveled road is displayed according to whether the vehicle position is on a presently displayed road, the traveled road image generating section generating an image of the presently-traveled road is not displayed; and an image synthesis section coupled to the traveled road image generating section and which displays the image of the presently-traveled road by superimposing the image on the displayed map;

wherein the traveled road image generating section includes a map buffer; and wherein the traveled road image generating section writes data of a second map showing the presently-traveled road into the map buffer and generates the image of the presently-traveled road from the data written into the map buffer; and wherein if the scale of the displayed map is 1/n while wherein the scale of the second map is 1/m where m<n, the image of the presently-traveled road is displayed at a scale of m/n.

* * * * *

UNITED STATES PATENT AND TRADEMARK OFFICE
CERTIFICATE OF CORRECTION

PATENT NO. : 5,925,091
DATED : July 20, 1999
INVENTOR(S) : Katsunori Ando

Page 1 of 2

It is certified that error appears in the above-indentified patent and that said Letters Patent is hereby corrected as shown below:

On the Title Page, item [56]

In column 1, after line 1, under "U.S. PATENT DOCUMENTS", insert the following:

--4,470,119    09/1984    Hasebe et al.    701/208
  4,511,973    04/1985    Miura et al.     701/208
  4,514,810    04/1985    Ito et al.       701/208--.

In column 1, after line 3, under "U.S. PATENT DOCUMENTS", insert the following:

--4,638,438    01/1987    Endo et al.    701/212--.

In claim 7, line 2, change "di splayed" to --displayed--.

In claim 23, line 17, change "of" (first occurrence) to --if--.

UNITED STATES PATENT AND TRADEMARK OFFICE
CERTIFICATE OF CORRECTION

PATENT NO. : 5,925,091
DATED : July 20, 1999
INVENTOR(S) : Katsunori Ando

It is certified that error appears in the above-indentified patent and that said Letters Patent is hereby corrected as shown below:

In claim 23, line 19, after "presently-traveled" insert --road--.

In claim 25, line 23, delete "wherein".

Signed and Sealed this

Seventh Day of March, 2000

Attest:

Attesting Officer

Q. TODD DICKINSON

Commissioner of Patents and Trademarks